(12) United States Patent
Waelbroeck et al.

(10) Patent No.: US 8,095,456 B2
(45) Date of Patent: Jan. 10, 2012

(54) BLOCK TRADING SYSTEM AND METHOD PROVIDING PRICE IMPROVEMENT TO AGGRESSIVE ORDERS

(75) Inventors: Henri Waelbroeck, Scarsdale, NY (US); Fred J. Federspiel, Larchmont, NY (US); Andrew Roper, Brooklyn, NY (US); Howard S. Engelhart, Hoboken, NJ (US); Sean Kirkpatrick, Chesterfield, NJ (US)

(73) Assignee: Pipeline Financial Group, Inc., New York, NY (US)

( * ) Notice: Subject to any disclaimer, the term of this patent is extended or adjusted under 35 U.S.C. 154(b) by 0 days.

(21) Appl. No.: 12/975,628

(22) Filed: Dec. 22, 2010

(65) Prior Publication Data

US 2011/0178914 A1 Jul. 21, 2011

Related U.S. Application Data

(63) Continuation of application No. 12/181,028, filed on Jul. 28, 2008, now Pat. No. 7,882,015.

(60) Provisional application No. 60/962,307, filed on Jul. 26, 2007, provisional application No. 60/981,242, filed on Oct. 19, 2007, provisional application No. 61/032,623, filed on Feb. 29, 2008, provisional application No. 61/043,172, filed on Apr. 8, 2008.

(51) Int. Cl.
*G06Q 40/00* (2006.01)
(52) U.S. Cl. .......................................... 705/37; 705/38
(58) Field of Classification Search ............... 705/37–38
See application file for complete search history.

(56) References Cited

U.S. PATENT DOCUMENTS

2006/0259394 A1* 11/2006 Cushing et al. ................. 705/37
2009/0119224 A1* 5/2009 Petrino ....................... 705/36 R \* cited by examiner

*Primary Examiner* — Thu Thao Havan
(74) *Attorney, Agent, or Firm* — Cowan, Liebowitz & Latman; Steven D. Underwood

(57) ABSTRACT

An exemplary embodiment comprises a method for trading items among a plurality of traders, the method comprising: (a) receiving a first order for at least one item from one of the traders into an electronic trading system, wherein the first order provides priority for said at least one item but does not reserve said at least one item; (b) receiving, from another one of the traders, a second order into the electronic trading system that matches said first order; (c) determining that at least a portion of the first order is available to be filled by at least a portion of the second order; (d) reserving said at least a portion of said first order for execution against said at least a portion of said second order; and (e) executing said at least a portion of said first order against said at least a portion of said second order.

9 Claims, 13 Drawing Sheets

FIG. 1

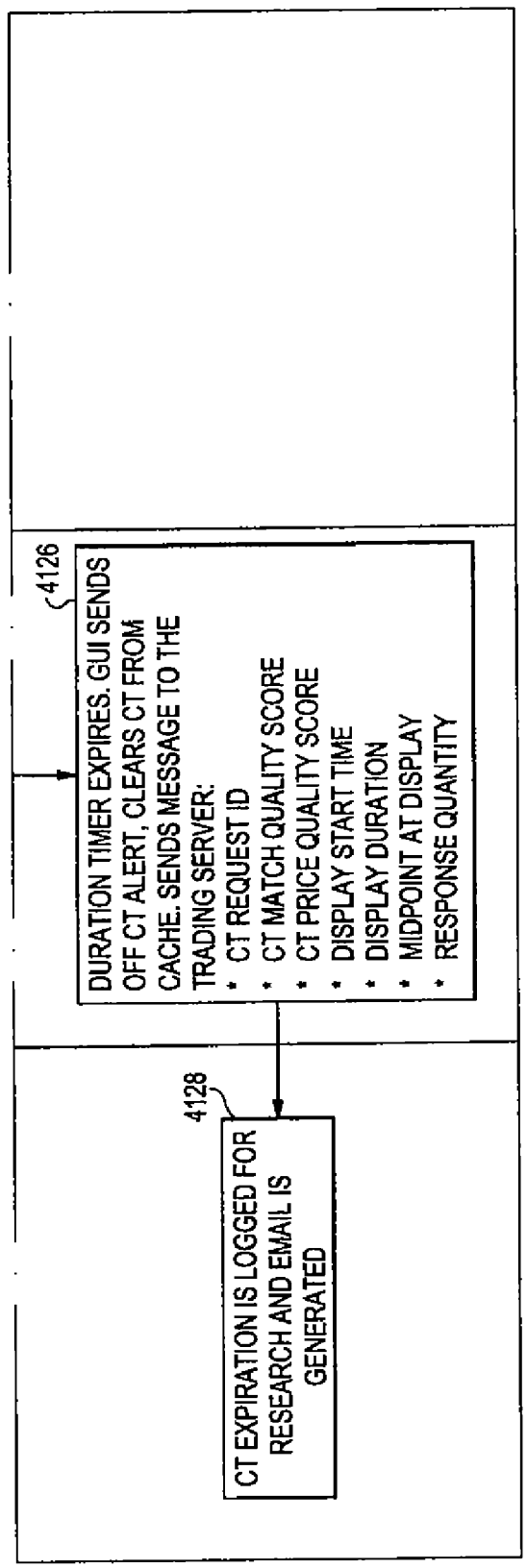

BLOCK TRADING SYSTEM AND METHOD PROVIDING PRICE IMPROVEMENT TO AGGRESSIVE ORDERS

CROSS REFERENCE TO RELATED APPLICATIONS

The present application is a continuation of U.S. patent application Ser. No. 12/181,028, filed Jul. 28, 2008, now U.S. Pat. No. 7,882,015 which claims the benefit of U.S. Provisional Application Nos. 60/962,307, filed Jul. 26, 2007; 60/981,242, filed Oct. 19, 2007; 61/032,623, filed Feb. 29, 2008; and 61/043,172, filed Apr. 8, 2008. Related subject matter is disclosed in U.S. patent application Ser. No. 10/310,345, filed Dec. 5, 2002; U.S. patent application Ser. No. 10/603,100 filed Jun. 24, 2003, U.S. patent application Ser. No. 10/799,205, filed Mar. 11, 2004; U.S. patent application Ser. Nos. 11/783,250 through 11/783,254, all filed Apr. 6, 2007; and U.S. patent application Ser. No. 12/153,362, filed May 16, 2008. The disclosures of all of the above-referenced applications are hereby incorporated by reference in their entireties into the present disclosure.

FIELD OF THE INVENTION

The present invention is directed to order management in financial trading and more specifically to such order management that that enables users to expose the liquidity contained in their Order Management Systems (OMS's) to other traders without compromising the security of their confidential trade information.

DESCRIPTION OF RELATED ART

In public securities markets, market mechanics and trading psychology create barriers to efficient information dissemination and price discovery. A market participant's decision to reveal information about his or her true price limits represents a tradeoff between the market impact cost of affecting price expectations and the opportunity cost of delaying or failing to execute a trade. As used herein, the term "market participant" refers to any person or firm with the ability to trade securities or other financial products; examples of market participants include broker-dealers, institutions, hedge funds, statistical arbitrage and other proprietary trading operations, and private investors trading on electronic communication networks (ECNs).

By displaying a buyer's true price limit to one or more prospective sellers, for example, a market participant is in effect writing an option that either of the sellers may freely elect to execute; as long as this option is open it sets a lower bound on the market participants' expectations of what the fair trade price should be. Even if one of the sellers originally had a lower price expectation, this expectation is immediately changed when the buyer's price limit is known, the only remaining question being whether the fair price should be even higher. Indeed, by disclosing a high price the buyer indicates an eagerness to acquire the stock, which may reflect information that has yet to come to the seller's attention.

Broker-dealers cope with this problem by carefully managing expectations of parties on both sides of a trade until a fair price has been discovered, and then proposing a fair trade price that can be satisfactory to both. Today such agency orders are increasingly delivered electronically. Orders identified as "not held" are not displayed on the public market, to avoid the above-mentioned impact on price expectations. Brokers may receive crossing not held orders on the buy and sell sides, and find themselves in the position of having to choose a fair price to execute the crossed trade, somewhere between the limits of the two orders. Discretion is normally used when handling such a situation. For example, if a buyer has placed a large block buy order at $30.00 at 10:00 AM, and the market has since fallen to a current best offer of $29.80, a large block sell order at $29.99 would most likely not be automatically crossed at this price, since it now seems expensive compared to the current market; the buyer's limit is interpreted as an instruction to stop buying if the market price were to rise above this level. But a block sell order at $29.82, which also crosses the buyer's much higher limit, would probably be accepted, while one at $29.85 might prompt the broker to call the buyer.

This human intermediation comes at a steep price, both in terms of commissions paid and in terms of information leakage to individuals who have close relationships with aggressive trading firms such as hedge funds. This has fueled a desire from large institutions to find an alternate marketplace where they can post their orders themselves, without discretionary intervention by a traditional broker.

Electronic markets such as NASDAQ or Electronic Communication Networks (ECNs) are not well equipped to handle the price discovery problem for large block trades. In its simplest form, an electronic marketplace simply displays the trading interests of the buyers and sellers to their subscribers, which then have the ability to execute such buy and sell interests. To avoid impacting the market participants' price expectations, users of electronic markets typically place relatively small orders at passive prices, and patiently wait for others to execute them, or take a somewhat more aggressive stance and execute the orders that others have posted on the other side of the spread.

Tools are available to "slice and dice" larger orders into a large number of small pieces that can be worked in this manner, but their activity inevitably reveals the existence of the larger order to those who are skilled in the art of statistical analysis. Such traders develop and optimize trading strategies that deliberately detect large confidential orders as they are being worked, and generate profits by anticipating the market impact that those orders are likely to cause. The simplest such strategy is that of taking a position ahead of the larger order and relying on its continued presence to push the price in a profitable direction. By trading in the same direction as the large order, such parasitic strategies end up exacerbating the price movements that would naturally have been caused by the large order in the first place. The end result is not altogether different from that of posting a large order on the New York Stock Exchange: in the latter case, floor traders join in to "participate" with an auctioned order, or directly step in front to intercept the liquidity that it was able to attract. The terms "penny-jumping" and "front-running" have come to be applied to describe this type of parasitic strategy on the NYSE floor and on electronic marketplaces alike.

Some ECNs offer more sophisticated order types in an attempt to alleviate the front-running problem. Some of these (e.g., discretion orders), simply try to mask the true price limit by showing one price but grabbing priority to execute up to a higher confidential price limit. These suffer from simple counter-strategies, such as that of spraying small orders at different price levels to see when an order gets executed at an undisplayed price level. Other sophisticated order types use minimum quantity conditions in conjunction with hidden discretionary prices to avoid detection by sprays of tiny orders. Since no price is displayed there is no "price revelation" in the traditional sense. Yet, a block trader with a contra interest can discover the first order's limit, and would indeed have a fiduciary obligation to do so, simply by repeatedly placing and canceling orders at steadily worse price levels until the order intersects with the resident order's limit. Thus, although price expectations are not altered prior to the trade, a trader who places a large hidden order on an ECN to buy at $30.00 should indeed expect to trade at $30.00, even if the seller would otherwise have been willing to accept any price down to $29.90.

As a result, electronic books such as SuperMontage have difficulty attracting significant size orders at attractive price levels, as most participants quickly learn that it is more profitable to lurk in the shadows and take what prices others are willing to show, or display small sizes at a time. This has led to an evolution of the marketplace wherein the average trade size has fallen steadily to about 500 shares while the total traded volume and average institutional order sizes have been increasing.

In this environment, there is an acute need for an electronic trading system that rewards traders who are willing to confidentially express their true price aggression with the benefit of price improvement when the contra party is similarly aggressive. In such a block trading solution, the optimal strategy for aggressive traders should be to place their orders with an aggressive price, while passive traders would naturally be best served by placing passively priced orders.

Yet answering such a need cannot come at the expense of the main perceived advantage of electronic trading systems over traditional marketplaces, which is the ability to instantly execute trades with no human intermediation or pre-trade information leakage.

The challenge, in short, is to protect an order that is electronically executable at an aggressive limit price from actually being executed at such an aggressive price when the contra was in fact willing to be aggressive as well.

To tip the scale back in favor of the party who has placed an aggressive order, without losing the perceived advantage of electronic-speed executions and without the mediation of a third party, one must identify value items that can strengthen the negotiating position of a party who is willing to express an aggressive price. One such value item is information. Related application Ser. No. 10/603,100, filed Jun. 24, 2003; Ser. No. 09/870,845, filed May 31, 2001; Ser. No. 09/750,768, filed Dec. 29, 2000 and Ser. No. 09/585,049, filed Jun. 1, 2000 (the entire contents of each are incorporated herein by reference) show how parties willing to confidentially disclose Certified Trading Interest information to a computer system can gain the right to receive Certified Trading Interest information from other parties who are interested in trading with them. This opens the possibility of reversing the arrow of information flow when a trader places an aggressively-priced order in a trading system: the aggressive price is not shown to third parties, but instead helps the trader attract information from third parties with more passive offers.

In addition, users of the inventions referenced above may wish to have the added option of directly exposing the liquidity within their OMS (Order Management System) to other traders using the subject system without submitting any confidential trade information to the subject system's centralized trading server(s). From this point forward said subject system's centralized trading servers are referred to as PTS or Pipeline Trading Server(s). The invention disclosed herein provides traders with that option by creating a decentralized process whereby information about a specified subset of the orders contained in a trader's OMS and/or the orders in the OMS itself are checked for matches with orders resident in the subject system without requiring the trader to submit those orders to the PTS.

SUMMARY OF THE INVENTION

It is therefore an object of the invention to enhance the trading experience by expanding the various ways a user of the subject system can expose the liquidity in his OMS without sacrificing the security of his confidential trade information.

One aspect of the invention designed to enhance the trading experience by expanding the various ways a user of the subject system can expose the liquidity in his OMS allows users to expose the liquidity in their Order Management Systems and to search the liquidity in the Order Management Systems of other traders without requiring users to enter the full contents of those Order Management Systems into the PTS. This aspect of the subject system permits users to send an order query, in the form of an encrypted message containing a firm, executable order, to the subject system's desktop applications (from this point forward referred to as the client GUI) of users who have elected to allow the subject system to search their Order Management Systems for potential contra orders. If the client GUI finds a match in response to one of these encrypted queries, it presents the user whose OMS has been searched with the opportunity to enter a firm, auto-executable order in response to the query. As a result, users of the system have the ability to expose the full range of liquidity contained in their Order Management Systems to all of the users logged into the subject system without sending any confidential trade information to the PTS. This aspect of the invention succeeds in creating a decentralized marketplace for order execution, ensuring that 1) the PTS never "knows" what is contained within a user's OMS and 2) users of the subject system are not required to send confidential trading information from their OMS to the PTS in order to expose their liquidity in their Order Management Systems to the orders resident in the subject system. This aspect of the invention can be referred to as "Contra Targeting."

Another aspect of the invention designed to enhance the trading experience by expanding traders' options for exposing the liquidity in their Order Management Systems is a "Virtual Order" that gives an order entered into the subject system time priority in the subject system order queue without actually reserving the shares represented in that order until the moment of execution. The purpose of this aspect of the invention is to allow users to trade some/all of the shares from a Virtual Order elsewhere on the market while the user is waiting for a large block contra to some/all of the shares represented in the Virtual Order. Then when the Virtual Order matches with another order in the subject system; the subject automatically checks the OMS of the Virtual Order's owner or information from the OMS of the Virtual Order's owner to determine the number of shares from the Virtual Order that are still available for execution; reserves as many shares from the Virtual Order as are available for execution, and automatically executes the order. It is important to note that while the shares represented by the Virtual Order are not reserved by the subject system until the moment of execution; the Virtual Order is still a firm, auto-executable liability. When a Virtual Order is matched in the subject system the initiating user is not given the option of cancelling the order or altering the size or price of the order before execution; the subject system automatically executes as many of the shares represented by the Virtual Order that are still available. This feature addresses a previous limitation of the subject system whereby large block orders entered into the subject system were "tied up" and unavailable for execution outside of the subject system while they sat in the subject system waiting for a large block contra; thereby making users more likely to limit the number and size of the orders they entered into the subject system. With the Virtual Order option traders can enter more, large block orders into the subject system knowing that they are not missing the opportunity to work some or all of those orders elsewhere on the market while waiting for a large block contra that may or may not materialize.

One of the unique aspects of the subject system as described in the applications incorporated by reference above is the subject system's methodology for attracting liquidity to the system by using sideless, sizeless and priceless "active symbol notifications" that alert users to the presence of firm order activity in the system in specific symbols. In an improvement upon this methodology for attracting liquidity, each of the various embodiments of the invention described herein are also usable with "stealth mode," which eliminates a perceived source of information leakage associated with said active symbol notifications. This stealth mode addresses these perceived sources of information leakage by allowing some customers to submit firm auto-executable orders that either do not trigger the active symbol notification at all or only trigger the active symbol notification on a limited basis. The purpose of this stealth mode is to give an order entry option to users who want to enter order(s) into the subject system but who are not interested in trying to attract liquidity through the active symbol notification.

The preferred embodiment of this stealth mode gives traders a 'Stealth' order entry option at the point of order submission that can follow "Dark" or "Black" order indicating rules, as described herein. Stealth, Black and Dark are all terms that correspond to a specific user interface and should not be construed as limiting. The rules associated with the Stealth option may be configured on the PTS at the firm/user level.

In the preferred embodiment the default rule for the Stealth order will be Dark, but other embodiments can have the default as Black. In a preferred embodiment the Dark and/or Black Stealth order option is only provided to a subset of buy side customers; however in other embodiments, Stealth orders will be provided for all customers including all buy side and sell side users.

When a user enters a firm, auto-execute order in the system as "Dark," rather than triggering the active symbol notification as in the "typical" order handling rules, the corresponding symbol will not display the active symbol notification. Furthermore, once the order is active in the subject system, that order will only trigger the active symbol notification on a minimal basis; and when it does trigger the notification, it will have a very brief duration and there will be significant delays between notification events when they do happen. More specifically, when Dark orders generate the active symbol notification, the notification will flash for a limited period of time (mimicking IOC ("immediate or cancel") orders), with a delay between flashing events from 1 to 40 minutes. In addition, Dark orders do not have standing, meaning they are not given Price-time priority in the subject system's order queue. More specifically, if a Dark order is resident in the system at the same time as an order in the same symbol on the same side with the same price that is not classified as Dark (or Black), and a contra to the orders arrives in the system; the non Dark order will receive the execution even if it was entered after the Dark order.

Dark orders will trigger contra present indications, one of the subject system's types of liquidity notification that alerts users to the presence of a "passive" (an order priced below a reference price) contra orders in the subject system. This reference price can be a reference price as described in application Ser. No. 10/799,205, filed Mar. 11, 2004 or any other reference price reflective of current market prices as could be imagined by one skilled in the art. As stated in the introduction, the purpose of the contra present indication is to reward users willing to enter "aggressive" orders (orders priced at or above a reference price) by reversing the flow of information and giving them the option to trade at a price below the mid-point of a reference price when their aggressive orders are matched with passive orders. More specifically if a Dark order is a passive order and an aggressive contra order is entered into the system; the user entering the aggressive contra order to that passive Dark order will receive a contra present notification alerting the user to presence of that passive Dark order. Furthermore, if a Dark order has an aggressive price and a user enters a passive contra order to that aggressive Dark order the trader who entered the aggressive Dark order will receive the contra present notification alerting that user to presence of the passive contra order.

When a user enters a firm, auto-execute order in the system as "Black," that order will never generate an active symbol notification. In addition, a passive Black order will not trigger a contra present indication if an aggressive contra order is entered into the system; nor will an aggressive Black order earn a user the right to see a contra present indication in the event another user enters a passive contra to that aggressive Black order. Like Dark orders, Black orders do not have standing, meaning they are not given Price-time priority in the order queue. More specifically, if a Black order is resident in the system at the same time as an order in the same symbol on the same side with the same price that is not classified as Black (or Dark), and a contra to the orders arrives in the system; the non-Black order will receive the execution even if it was entered after the Black order. The Black order option may be limited to certain authorized users who have permission to access the feature. This permission can be granted based on any number of criteria as will be understood by those skilled in the art, including but not limited to user or firm level trade history or firm classification, e.g., buy side or sell side customer, assets under management.

BRIEF DESCRIPTION OF THE DRAWINGS

Preferred embodiments of the invention will be set forth in detail with reference to the drawings, in which.

DETAILED DESCRIPTION OF THE PREFERRED EMBODIMENTS

Figure 2:
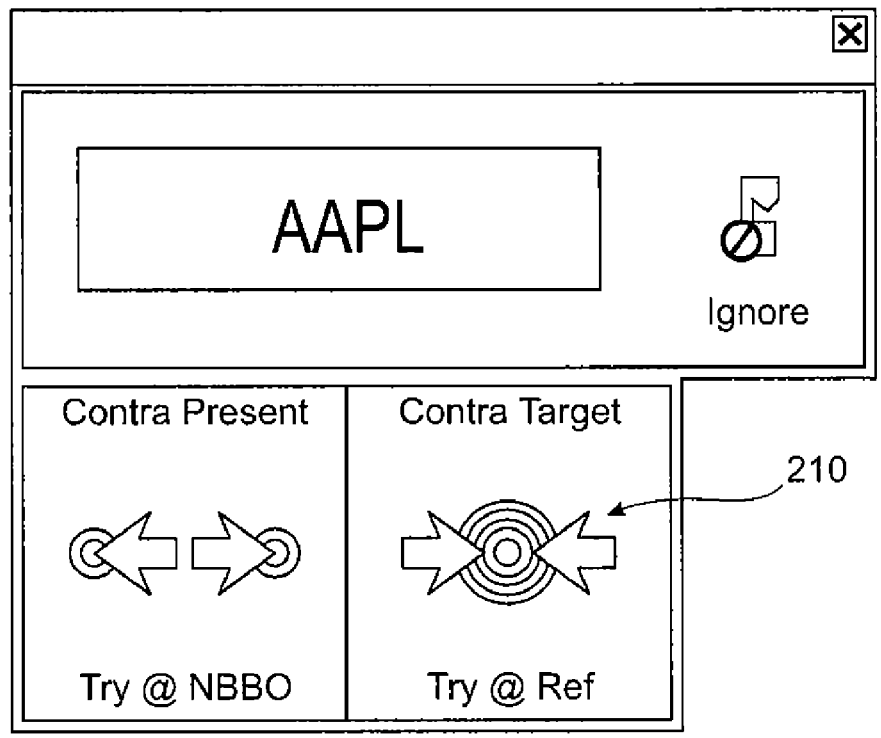
FIG. 2 represents an example of a pop-up notification for the contra tracking.

Preferred embodiments of the invention will be set forth in detail with reference to the flow charts of FIGS. 4A-4C. There are three primary elements that enable the execution of the Contra Targeting feature.

The first element is called the Contra Request Service. This back-end service resides at the PTS and will process orders requesting Contra Targeting. This service will generate a list of candidate traders potentially eligible to receive Contra Target Notifications based on the criterion set on the requesting order. The Contra Request Service will disseminate Contra Target Notification Requests and collect Contra Target Results.

The second element is called the client GUI and can run on the trader's desktop at the trader's workstation. The client GUI is responsible for calculating a qualification score based on the Contra Target order attributes and data contained about order(s) in the trader's OMS. The client GUI also displays the Contra Target notification to the trader if the Ranking Service determines orders in the trader's OMS are qualified and authorizes the client GUI to display the notification.

The third element is called the Ranking Service. The Ranking Service is a separate back-end process which can either reside at the PTS or be hosted at third party location, which evaluates Contra Target qualifying scores and authorizes eligible client GUIs to display the Contra Target notification.

The Contra Target option is available on an order by order basis to traders submitting orders via the client GUI that are pegged to the market to execute at the midpoint of the market as determined by the National Best Bid/Offer or the midpoint of the Block Price Range as described in application Ser. No. 10/603,100 filed Jun. 24, 2003, or the midpoint of any other published price reflecting the midpoint price of the market as could be imagined by one skilled in the art, or with a limit more aggressive than the midpoint of the market. There will be four levels of Contra Targeting, as given in Table I below.

TABLE I

| Level | Option | Description |
|---|---|---|
| 0 | None | No Contra Targeting. |
| 1 | Recently Active | Institution and Hedge Fund Traders with a Contra Order in the System, same day that meets certain criteria. |
| 2 | All Institutions | Level 1 + The contra notification will be displayed to traders at institutions only with contra orders >= MinQty in their OMS. Sell-side desks and hedge funds will be excluded. (Eligible quantity for a Contra Target should be OMS Available + Pipeline Active) |
| 3 | All Buy-Side Firms | Levels 1, 2 + The contra notification will be displayed to traders at all buy side firms (institutions and hedge funds) that have contra orders >= MinQty in their OMS. |

The PTS should support the concept of a NULL/UNDEFINED Contra Targeting Option for Orders sent via other applications. When the server receives an Order with Contra Targeting=NULL, it would apply a firm-level default Contra Target Level. Initially this Level would be "0: None". A system administrator can later choose to change it to "1: Recently Active".

When receiving a new order request (FIG. 4A, step 4102) with the Contra Targeting option set to any value other than "None," the Contra Request Service will be tasked with assembling a list of candidate recipients. In order to build a candidate recipient list (FIG. 4A, step 4104), the service will need to know the information about Pipeline Customer Firms set forth in Table II below. This information will be stored in the system database and will be accessible via the system help desk application. Like other firm attributes, these should be "live updatable."

TABLE II

| Firm Setting | Values |
|---|---|
| Firm Type | Broker/Dealer, Institution, Hedge Fund |
| Contra Target Eligible - OMS | Flag (true/false). If false, will be excluded from receiving Contra Target messages based on Levels 2 and 3 (OMS integrations). |
| Contra Target Eligible - Recent Activity | Flag (true/false). If false, will be excluded from receiving Contra Target messages based on Level 1 (recent activity). |

The Contra Target Request Service will use these firm attributes to assemble an initial list of eligible recipients based on the criterion of the Contra Targeting value on the new order. In order to qualify for a Contra Target message based on Recent Activity, a trader must meet one of the following qualifications. First, the trader must be in a firm where Contra Target Eligible—Recent Activity is set to true. Second, the trader must be in a firm that is an Institution or Hedge Fund. Third, the trader must have submitted an order matching the following criteria: the recipient meets at least one of certain residency requirements; the order was priced at a reference price or better (at open or the time of order entry, whichever is later); or the order quantity at entry is at least equal to the minimum eligible quantity on the Contra Target Request.

The residency requirements are as follows. Residency is satisfied if the order is canceled/closed now but stayed in system for at least N minutes after the market open; if the order is canceled/closed now but an execution on the order already occurred meeting some minimum size requirement (said minimum size requirement here forward referred to as a Large Block Quantity or LBQ); if the order is currently active in the system but has a price that is limited below a reference price; if the order is currently active in the system but has a minimum execution quantity that is too large for the source order; if the order is active in the system and is priced at or better than a reference price; or if the order is canceled/closed but was priced at a reference price or better. If the order was placed after the stock began trading for the day, the residency requirement is satisfied if the order was priced at or better than a reference price at the time the order was entered. If the order was entered before the opening of the stock, the residency requirement is satisfied if the order was priced at or better than a reference price at the time the market opened.

If the user entering the Contra Target request has selected Level 1 only, the list assembly is complete here. However, if the user entering the Contra Target request has selected levels 2 or 3, further checks must be performed.

Traders who qualify for receiving Level 1 Contra Target notifications may be in a state where they are blacked-out from receiving the active symbol notification. If the Contra Target Order is targeting Levels 2 or 3 the Contra Request Service will add to the candidate list traders from firms with "Contra Target Eligible—OMS" set to true, and that match the appropriate firm type.

Figures 1, 4A:
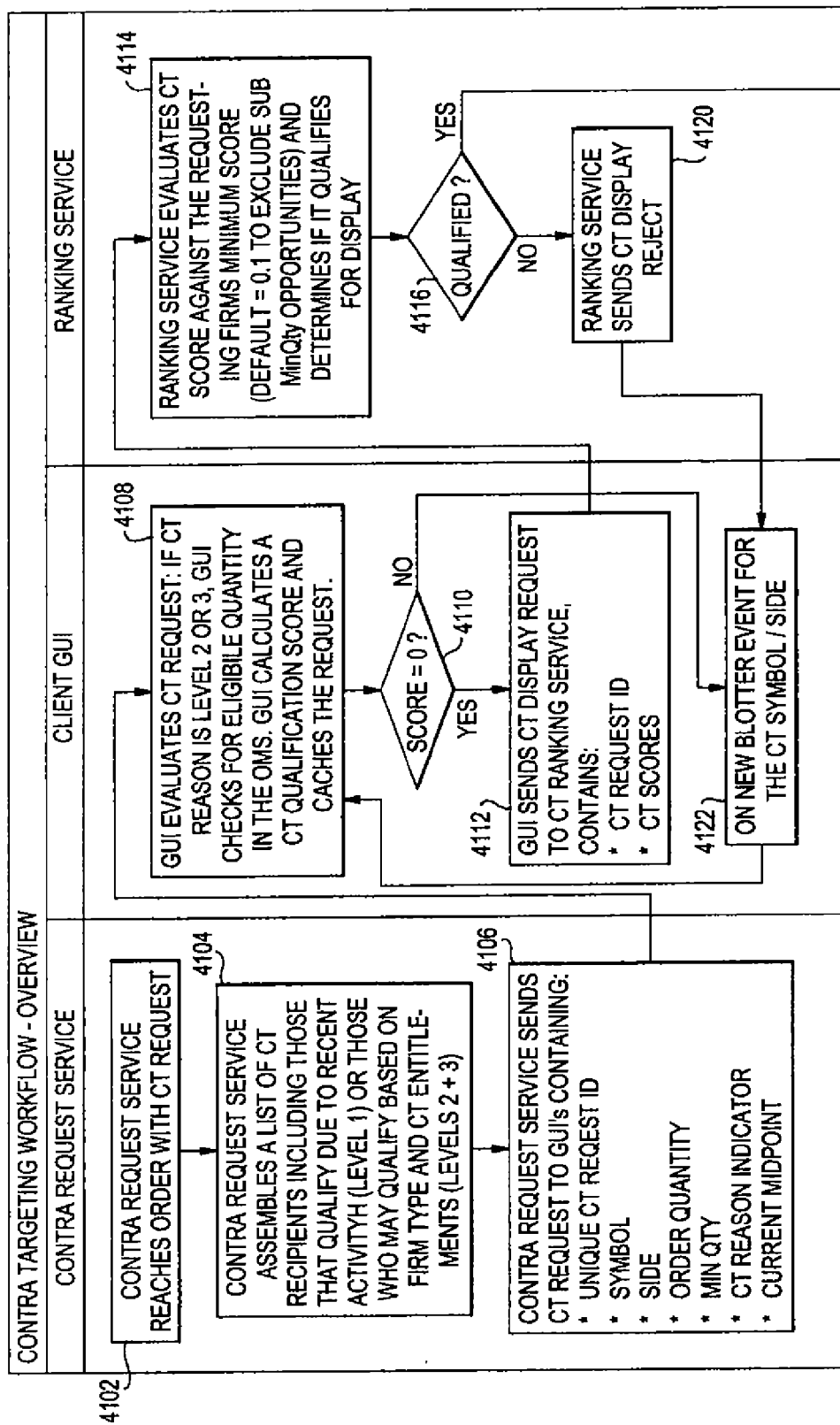
FIG. 1 represents an example of an order entry screen for a preferred embodiment of the present invention for Contra Targeting.
FIGS. 4A-4C are flow charts of the preferred embodiment for Contra Targeting.
Figures 2, 4A:
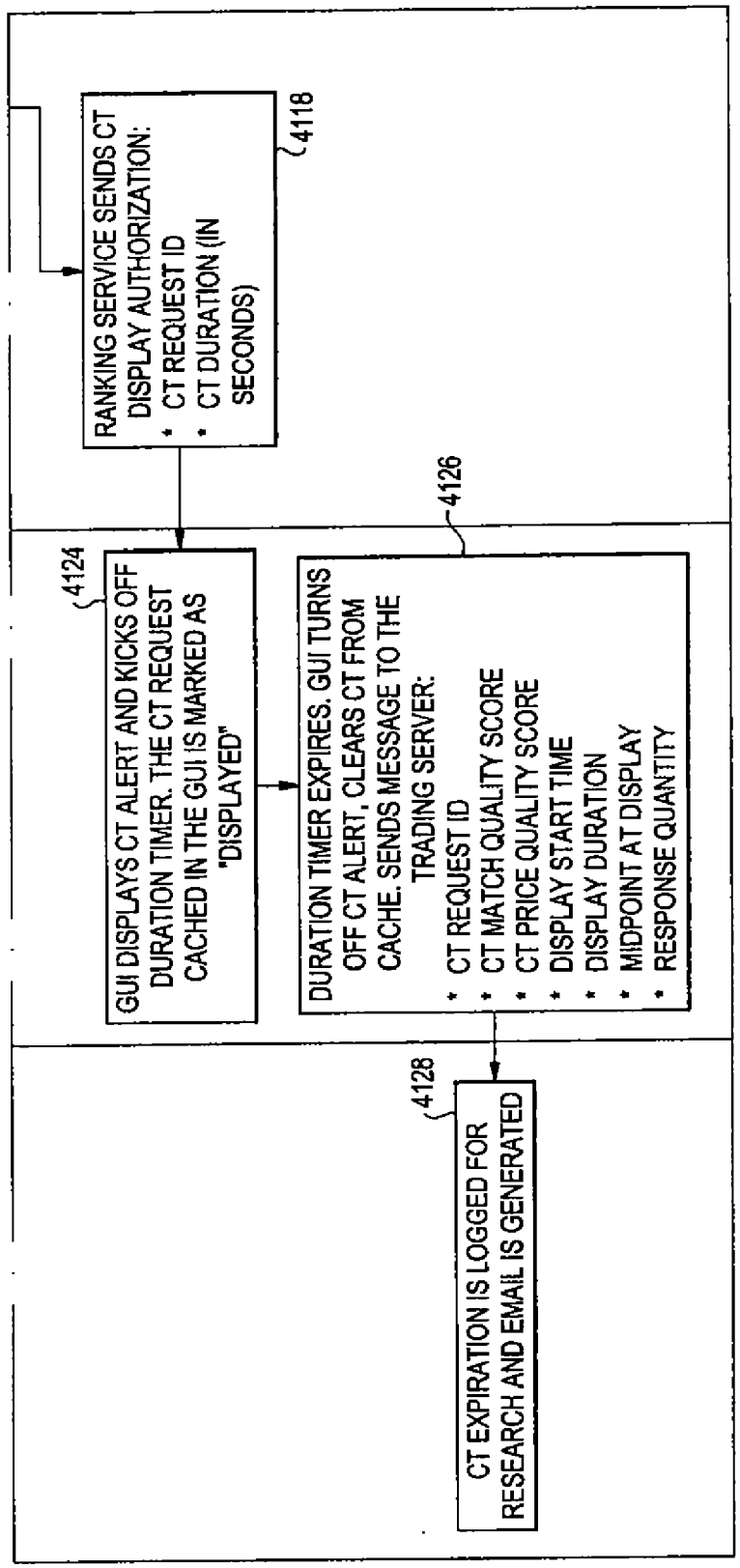
Figures 1, 4B:
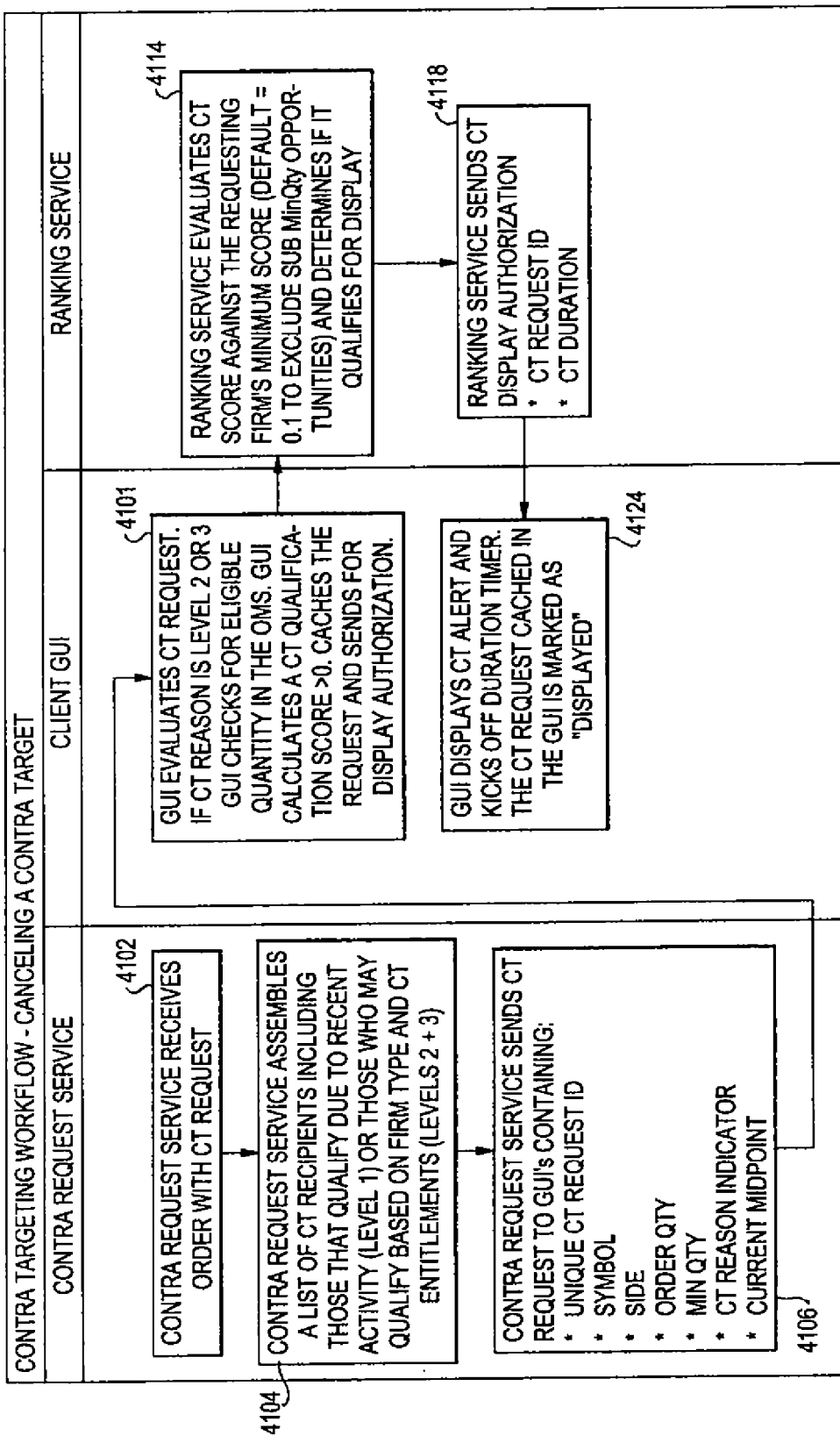
Figures 2, 4B:
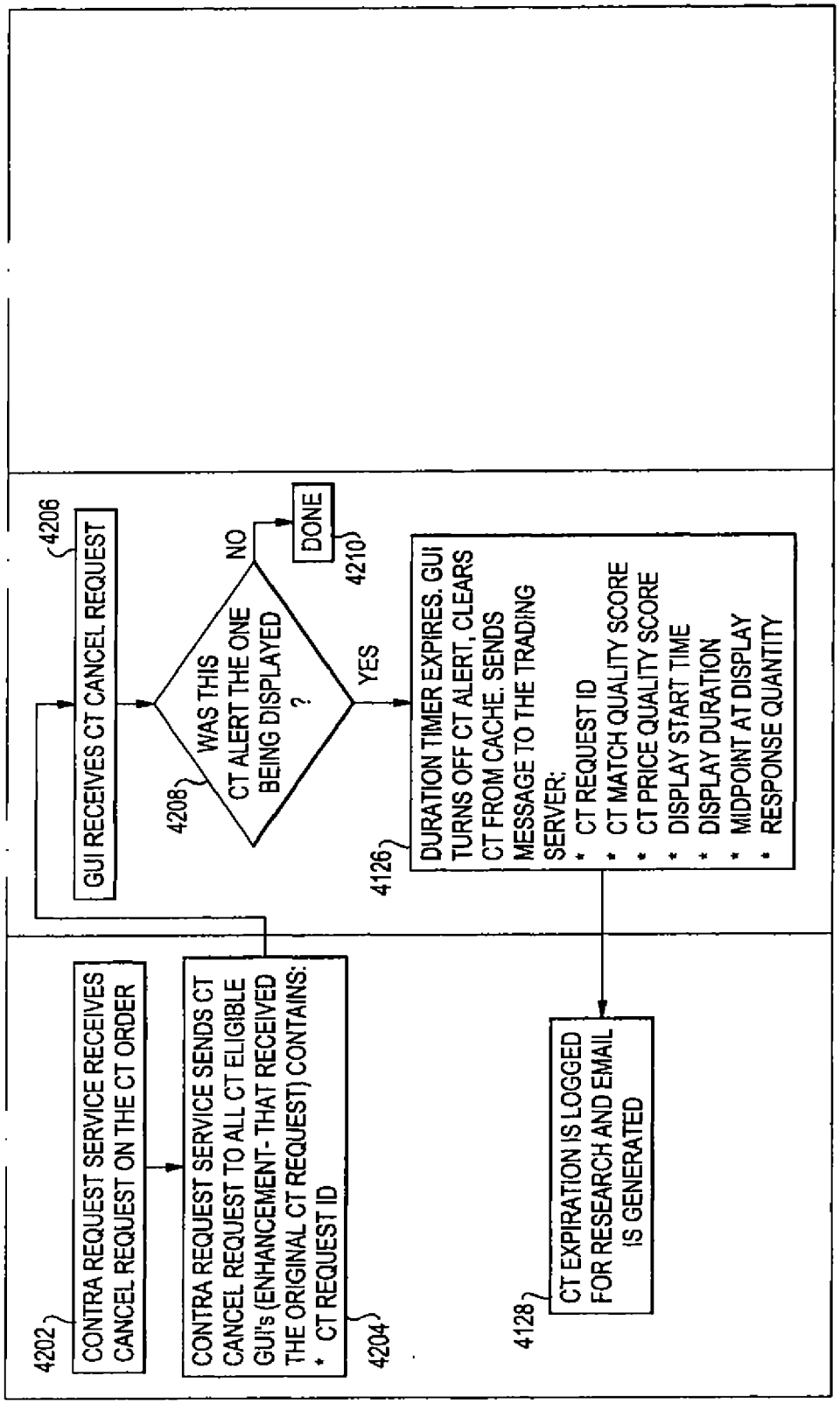

Once the Contra Request Service has assembled a list of Contra Target Candidates it will send each candidate a Contra Target Request Message (FIG. 4A, step 4106). The Contra Target Request message will transmit data relevant to the Contra Target requesting order sufficient to enable the client GUI to calculate a pre-qualification score (FIG. 4A, step 4108) used to determine whether or not the notification should be displayed to the trader (FIG. 4A, step 4110). The Contra Target Request will carry the following data:

TABLE III

| | Contra Target Request<br>Contra Target Request |
|---|---|
| CT RequestId | Unique identifier of the Contra Target Request |
| Symbol | Symbol of the Contra Target Sender. |
| Side | Contra side to the Contra Target Sender (All sales will be represented as long sales.) |
| CT Order Qty | Number of shares of Contra Target Requesting order. |
| CT Order | MinExec Quantity set for the Contra Target Requesting order. |
| MinQty | Default to the LBQ. |
| Midpoint | Current midpoint of the symbol. |
| Recently Active | One of the following: |
| Reason | None<br>RecipientRecentFillReason<br>CTSenderIsTooSmallReason<br>RecipientWasActiveReason<br>RecipientHasPassivePriceReason |

Contra Target Requests are not sent until after the subject system has initiated trading in the symbol for the day. If an order is submitted prior to the time the subject system has initiated trading in the symbol for the day, the Contra Target Request will be held at the PTS. Once the symbol is opened for trading, the candidate list will be assembled, and the Contra Target Requests will be sent.

After a Contra Target notification has been displayed by the client GUI (FIG. 4A, step 4124), when it expires or the Contra Target request is canceled, the Contra Target Response message is sent back up to the Contra Request Service (FIG. 4A, step 4126) with the following data:

TABLE IV

| | Contra Target Response<br>Contra Target Response |
|---|---|
| RequestId | Unique identifier sent on the Contra Target Request. |
| Match Quality | The Contra Target Match Quality Score. |
| Price Quality | The Contra Target Price Quality Score. |
| Display Start Time | The timestamp of when the Contra Target Notification was shown to the trader. |
| Display Duration | The number of seconds the Contra Target Notification was actually displayed. |
| Midpoint At Display | The midpoint of the security when the Contra Target Notification was displayed. |
| Cancel Reason | Expired or Canceled |
| Response Quantity | The quantity of shares sent in response to the Contra Target Notification or 0 if no response |

The duration timer in steps 4124 and 4126 is provided to manage the length of time the display attributes of the confidential trading interest information is displayed. When the time period is over, the display is terminated, and advertisement results can be sent back to the contra request service. The advertisement results can include one or more of an advertisement request message ID, an advertisement request message qualification score, and the quantity of response orders a market participant entered in response to the display of the display attributes. Such information can be logged and e-mailed to the subject system's research department, where it can be used to police users' behavior monitoring the frequency with which a market participant sees a display of the display attributes of the confidential trading interest information and fails to respond. If the failures to respond passes a certain threshold, the Contra Request Service can either generate a notification to the subject system's help desk to call the market participant to warn against abusing the Contra Target notifications by repeatedly choosing to look at Contra Target notifications without entering responding orders, or can automatically block the market participant from receiving further Contra Target messages. The Contra Request Service can also store information from the advertising notification message to enable research to run scripts correlating receipt of contra information with price moves; if there is a correlation, a market participant can be blocked from receiving further Contra Target messages.

The Contra Target Log entry will be generated (FIG. 4A, step 4128) based on data cached in the Contra Request Service along with the Contra Target Response message transmitted by the client GUI. The following data will be captured:

TABLE V

| | Contra Target Display Log<br>Contra Target Display Log |
|---|---|
| RequestID | Unique identifier of the Contra Target Request |
| Recipient Name | Trader that received the Contra Target Notification |
| Recipient Firm | Firm of Trader receiving the Contra Target Notification |
| Recipient OMS-Qualification Score | Qualification Score calculated by client GUI |
| Recipient Response Quantity | Total shares entered while Contra Target Notification displayed. |
| Recipient Display Midpoint | The midpoint at time Contra Target Notification was displayed. |
| Sender Name | Name of Trader submitting order with Contra Target Request. |
| Sender Firm | Firm of Trader submitting the Contra Target Order. |
| Sender Order Symbol | The Contra Target Order Security. |
| Sender Order Side | The Contra Target Order Side. |
| Sender Order Limit | The Contra Target Order Limit Price. |
| Sender Order Size | The Contra Target Order Quantity. |
| Sender Order Min Qty | The Contra Target Order MinExec Quantity. |
| Sender Order CT Level | The Contra Target Order requested targeting Level. |
| Sender Order SE Setting | Switching Engine setting for the Contra Target Order. |
| Sender OE time | Submit time of Contra Target Order. |

This information will be sent to Research via e-mail and will also need to be stored in the data warehouse.

As previously stated, the purpose of the Ranking Service is to process Display Authorization Requests from qualified client GUIs (FIG. 4A, step 4112) and grant or deny permissions to display Contra Target notifications. The Ranking Service implements this logic with no specific knowledge of the orders associated with the Contra Target Request, the initiating trader's OMS or the targeted trader's OMS.

In variations of the present embodiment, the Ranking Service may collect Display Authorization Requests, aggregating them based on the Contra Target Request Id. Each Display Authorization Request has the data format set forth in Table VI below.

TABLE VI

| | Display Authorization Request<br>Display Authorization Request |
|---|---|
| RequestId | Unique identifier sent on the Contra Target Request. |
| Match Quality | The Contra Target Match quality Score. |
| Price Quality | The Contra Target Price quality Score. |

The present embodiment can be configured such that Requests will be responded to immediately.

In FIG. 4A, step 4114, the Requesting Service evaluates the Contra Target score against the requesting firm's minimum score (default 0.1 to exclude sub-minimum-quantity opportunities) and determines in FIG. 4A, step 4116, whether it qualifies for display. The Ranking Service will grant display authorization immediately (FIG. 4A, step 4118) to all requests where the score is greater than Minimum Contra Target Eligibility Score, which will be a configurable value assigned on a per firm basis. This value can be initialized to 0 (all requests granted). Otherwise, in FIG. 4A, step 4120, the Ranking Service sends a Contra Target Display Reject notification, and in step 4122, the GUI waits for a new OMS event for the Contra Target symbol/side.

The Ranking Service will use these settings from the Firm Configuration to implement its business logic.

TABLE VII

| Firm Setting | Values |
| --- | --- |
| Min CT Eligibility Score | Minimum score of Contra Target eligibility set for a Firm for it to receive authorization from the Ranking Service to view a Contra Target Notification. The default will be 0. |
| Display TTL Min/Max | A min/max range in seconds for the duration that a Contra Target Notification should be displayed. |

Edits from the Help Desk will have intra-day effect.
The Display Authorization Response will contain:

TABLE VIII

| Display Authorization Response Display Authorization Response | |
| --- | --- |
| RequestId | Unique identifier sent on the Contra Target Request. |
| DisplayFlag | Indicates whether or not permission is granted to show the Contra Target Notification. |
| DisplayTTL | If DisplayFlag = "Y" then the DisplayTTL will indicate the number of seconds the Contr Target Notification should be displayed before expiring, calculated based on the Firm Setting above. |

The work done by the client GUI can be divided between the steps associated with Qualifying for Display and the actual Display. The client GUI will cache the Contra Target Request and then calculate a Contra Target Match Quality and Price Quality Scores based on the OMS information and the information in the Request Message. The Contra Target Qualification Scores are calculated as follows. First, the Match Quality score is initialized as follows

TABLE IX

| Match quality score initialization | |
| --- | --- |
| Recently Active Reason | Initial Score Value |
| None | 0 |
| Passive Price | 1 |
| Was Active | 2 |
| Too Small | 3 |
| Recent Fill | 4 |

Second, the score is set to 0 for quantity mismatch or incremented by 2 or 6 if there is an OMS match. If there is an exact match in the OMS (same symbol, contra side, available quantity is at least equal to Min Qty, current price is within OMS limit price if any) then 6 is added to the initial score. If there is a mismatch in Min Qty but the available quantity is greater than LBQ, then the score is set to 0.02; if the available quantity is less than LBQ, then the score is set to 0.01. If the mismatch is only in the limit price, 2 is added to the initial score (trader can call PM).

Third, a Price Quality score is set. The "preference price" is set to be (in order of precedence): (a) the average price on fills so far today (from the OMS), if any; (b) the arrival price when the order first hit the OMS, if available (for intraday changes to the OMS, this can be the NBBO midpoint at the time of the change); (c) the limit price, if any; (d) the current price. The relative price improvement is calculated from the preference price to the current price, the price quality score shall be $x=(S-S\_preference)/S\_preference$ for OMS sells and with the opposite sign for OMS buy orders.

If the client GUI arrives at a Qualification Score that is greater than 0, a Display Authorization Request will be transmitted to the Ranking Service. Some time after the transmission of an Authorization Request, the GUI will receive a Display Authorization Response message. Upon receipt of the Display Authorization Response with the DisplayFlag="Y", the GUI will display the Contra Targeting Notification and initiate the DisplayTTL expiration countdown.

Traders that are eligible will receive the Contra Target symbol notification. If a Contra Target with a standing order in the system (large minimum or a limit below a reference price) is received, there will be an additional order entry option that reads "Trade at Midpoint". Selecting this order entry option will submit an IOC ("immediate or cancel") order. If the quantity entered for the order is insufficient to meet the contra order's minimum size requirement, the system can offer the responding trader the option to trade up to full eligible quantity.

There are two primary work-flows available to traders when submitting orders on Contra Target Notified symbols: "Normal Order Entry" and "Buy It Now." Normal Order Entry is identical to responding to active symbol notifications or submitting orders when there is no active symbol notification in a symbol. Clicking on and dragging the symbol will display three order entry options: "Block+Engine" "Block Only" and "Stealth". These three order options refer to a trader's ability to use the client GUI to enter an order in the subject system's Block Market only (as described in pending application Ser. Nos. 10/603,100 filed Jun. 24, 2003; 10/799, 205, filed Mar. 11, 2004, and 11/783,251), the block market and the Algorithm Switching Engine as described in (application Ser. Nos. 11/783,250 and 251), or in the block market or the block market and the Algorithm Switching Engine using the Stealth order option as described previously herein. Traders will also have the option of using the Contra Target Notification to set their preferences to "Ignore Notifications on Contra Targets." If an order is active when a Contra Target notification is to be displayed (which means that the Contra Target recipient's order is limited away, or that the Contra Target recipient's order has a large minimum requirement), clicking on and dragging the symbol will display the order management options of "Replace" and "Cancel".

After a trader submits an order in a symbol displaying the Contra Target notification, the subject system's normal rules for active symbol notifications are enforced. In most cases, a timely response to a Contra Target Notification will result in a fill. If the Contra Target Order is no longer aggressive at the point when a trader responds to the notification, the responding trader will get a Contra Present Notification. If, due to a race condition, the initiating Contra Target order is no longer active in the system or the price on the order falls outside of the National Best Bid/Offer then the active symbol notification will be turned "ON" or "OFF" depending on the prevailing order attributes and market conditions.

In "Buy It Now," the trader will have an additional order entry option designed to facilitate an easy IOC type response to Contra Target notification. Dragging and dropping a block on this additional order entry option will do all of the following: submit an IOC order (either new or replace if currently active); remove any currently passive limits or set the limit as pegged to a reference price, and for new orders put 100% of eligible quantity into the subject system's Block Market). In addition the order entry options will give traders the ability to choose to ignore Contra Target notifications by symbol for the remainder of the trading day. By choosing the Ignore option on the Contra Target Notification, the trader will be able to stop further Contra Target Notifications from being generated on that name for the duration of the trading day. This "Ignore" menu will offer several options including but not limited to "Ignore this Contra Block Order," "Ignore all Contra Notifications in [symbol] Today," or in the cases where the "Ignore" option has been selected, "Enable [Symbol] Contra Notifications." and The Contra Target Notification will remain in the recipient's client GUI until one of the following events occurs. When the contra target source order is Canceled, Filled, or Partially Filled below the LBQ, a cancel message for the Contra Target will be sent out by the server. In the Contra Target Cancel Notice, the RequestId is the unique identifier of the Contra Target Request. If the client GUI is displaying the Contra Target Notification matching the Contra Target RequestId, it will immediately turn-off the Contra Target Notification indicator and clear the notification from its cache and send Contra Target Results Message. If the TTL Expiration time-out is reached, the Contra Target notification will be deactivated and the Contra Target Results Message sent. Once the Contra Target Notification has been revoked a message will be sent back up to the Contra Request Service used to assure the fitness of the recipient to receive future notifications. The client GUI will only display one Contra Target Notification for a given symbol/side at a time. If a Contra Target Request arrives on a symbol/side that is currently being displayed, the client GUI will drop the new notification request on the floor. If the client GUI is not currently displaying a Contra Target notification for that symbol/side, it will cache the Request along with any others in a "Pending" status.

It will be common for a client GUI to receive Contra Target Notifications that it is unable to display either because the Qualification Score is 0 or the Ranking Service rejects a Display Authorization Request. These "un-displayed" Contra Target Requests should be held in a cache.

At each OMS Sweep Event, the client GUI will go through the cache and see if a new OMS order has arrived, or an existing OMS Order has changed such that the Qualification Function returns a result greater than 0.

When multiple conditions affecting symbol notifications apply to the same symbol, the order of precedence will be: Contra Present, Contra Target, Symbol Activity. For example, suppose that trader A submits a one-million-share order to buy at midpoint with a minimum quantity of 30%, while trader B submits a 500,000-share order to sell at offer and trader C submits a 100,000-share order to sell at midpoint. Trader A sees a Contra Present notification and Contra Present and Contra Target Notifications.

The Contra Targeting functionality should also be made available for "Enhanced Watch List" Integrations. Watch Lists are described in application Ser. Nos. 11/783,251 and 11/783,254. An Enhanced Watch List is one that provides symbol, side, and eligible quantity information. If a client GUI is configured to work with such watch list, and receives a Contra Target Notification, it should operate with logic similar to that of an OMS Integration where determining whether or not to display a Contra Target notification.

The various configuration data are as follows.

TABLE X

Firm Configuration Data

| Firm Setting | Values |
|---|---|
| Default CT Level | The Contra Targeting Level to apply to orders when the Contra Target Level received is NULL. Can be set at firm or trader level. |
| Firm Type | Broker/Dealer, Institution, Hedge Fund |
| Contra Target Eligible - OMS | Flag (true/false). If false, will be excluded from receiving Contra Target messages based on Levels 2 and 3 (OMS integrations). |
| Contra Target Eligible - Recent Activity | Flag (true/false). If false, will be excluded from receiving Contra Target messages based on Level 1 (recent activity). |
| Min CT Eligibility Score | Minimum score of Contra Target eligibility set for a Firm for it to receive authorization from the Ranking Service to view a Contra Target Notification. The default will be 0. |
| Display TTL Min/Max | A min/max range in seconds for the duration that a Contra Target Notification should be displayed. |

TABLE XI

Other Configuration Data

| Setting | Values |
|---|---|
| Min_Order_Lifetime | Minimum amount of time an order must have resided in the system (after the open) for it to qualify its sender for Level 1 Contra Targeting. |
| Min_Display_Time | The minimum amount of time (seconds) a Contra Target Notification would have to have been displayed to a trader and ignored to cause them to lose Level 1 privileges. |

The Contra Target Request sent by Contra Request Service to client GUIs includes the following:

TABLE XII

Contra Target Request
Contra Target Request

| | |
|---|---|
| RequestId | Unique identifier of the Contra Target Request |
| Symbol | Symbol of the Contra Target Sender. |
| Side | Contra side to the Contra Target Sender (All sales will be represented as long sales.) |
| CT Order Qty | Number of shares of Contra Target Requesting order. |
| CT Order | MinExec Quantity set for the Contra Target Requesting order. |
| MinQty | Default to the LBQ. |
| MidPoint | Current midpoint of the symbol. |
| Recently Active | One of the following: |
| Reason | None RecipientRecentFillReason CTSenderIsTooSmallReason RecipientWasActiveReason RecipientHasPassivePriceReason |

The Contra Target Response is sent by client GUI to Contra Request Service after it has completed display of a Contra Notification to the trader. The Response is not sent if the underlying notification was never displayed.

TABLE XIII

Contra Target Response
Contra Target Response

| | |
|---|---|
| RequestId | Unique identifier sent on the Contra Target Request. |
| Match Quality | The Contra Target Match Quality Score. |
| Price Quality | The Contra Target Price Quality Score. |
| Display Start Time | The timestamp of when the Contra Target Notification was shown to the trader. |
| Display Duration | The number of seconds the Contra Target Notification was actually displayed. |
| Midpoint At Display | The midpoint of the security when the Contra Target Notification was displayed. |
| Cancel Reason | Expired or Canceled |
| Response Quantity | The quantity of shares sent in response to the Contra Target notification or 0 if no response |

The Display Authorization Request is sent by client GUI to Ranking Service after processing a Contra Target Request and calculating a Qualification Score greater than zero.

TABLE XIV

Display Authorization Request
Display Authorization Request

| | |
|---|---|
| RequestId | Unique identifier sent on the Contra Target Request. |
| Match Quality | The Contra Target Match quality Score. |
| Price Quality | The Contra Target Price quality Score. |

The Display Authorization Response is sent by Ranking Service to the client GUI to indicate whether or not the GUI is authorized to display the underlying Contra Target Notification. This message may follow immediately upon receiving a Display Authorization Request, or after some delay.

TABLE XV

Display Authorization Response
Display Authorization Response

| | |
|---|---|
| RequestId | Unique identifier sent on the Contra Target Request. |
| DisplayFlag | Indicates whether or not permission is granted to show the Contra Target Notification. |
| DisplayTTL | If DisplayFlag = "Y" then the DisplayTTL will indicate the number of seconds the Contra Target Notification should be displayed before expiring, calculated based on the Firm Setting above. |

The Contra Target Cancel Notice is sent by Contra Service to client to indicate that a Contra Target Request is no longer valid. This could be triggered by the Cancellation, Completion, or partial execution to a value below the LBQ for the initiating order. The RequestID is a unique identifier of the Contra Target Request.

Order cancellation will be explained with reference to FIG. 4B, which is like FIG. 4A except for the following. In step 4202, the Contra Request Service receives a cancel request on the Contra Target Order. In step 4204, the Contra Request Service sends the Contra Target Cancel Request to all Contra Target eligible GUI's containing the Contra Target Request ID. In step 4206, the GUI receives the Contra Target cancel request. In step 4208, it is determined whether the Contra Target notification is the one being displayed. If not, the cancellation process is done in FIG. 4210. Otherwise, the process proceeds to steps 4126 and 4128.

Figures 1, 4C:
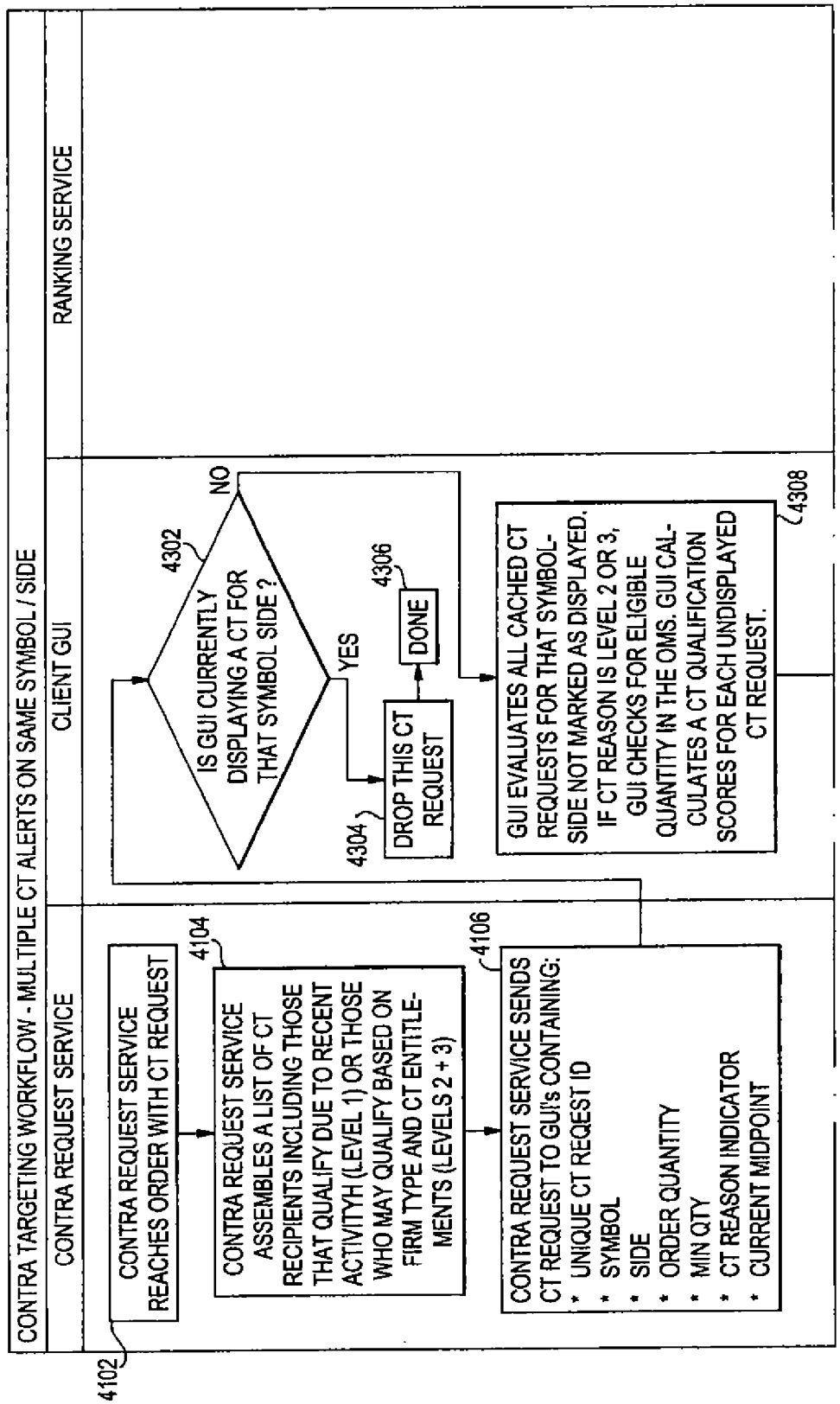
Figures 2, 4C:
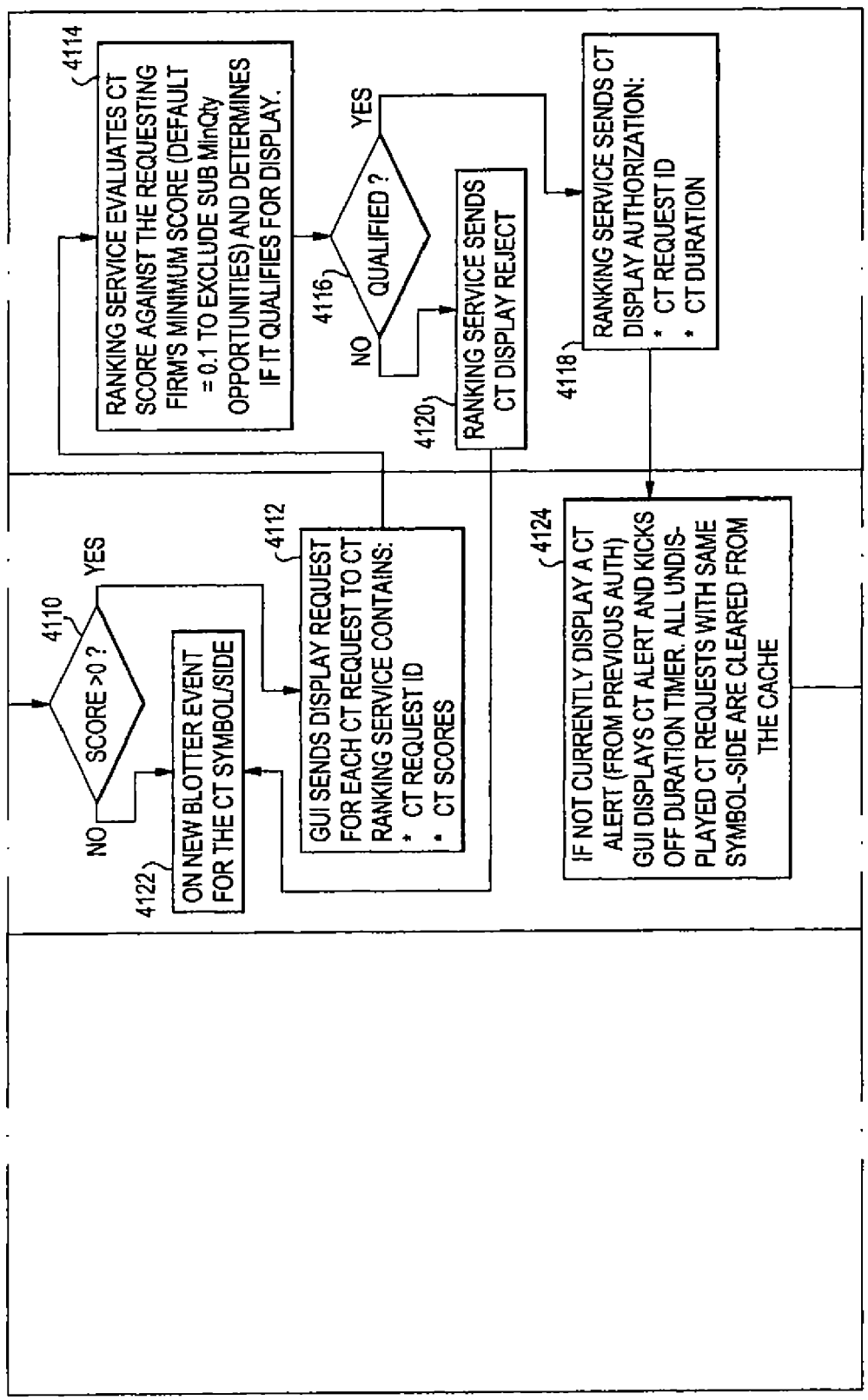

A workflow for multiple Contra Target notifications on the same symbol/side is shown in FIG. 4C, which is like FIG. 4A except for the following. In step 4302, it is determined whether the GUI is currently displaying a Contra Target for that symbol/side. If not, the Contra Target request is dropped in step 4304, and the process is done in step 4306. Otherwise, in step 4308, the GUI evaluates all cached Contra Target requests as previously explained, and the process proceeds as in FIG. 4A.

Figure 5:
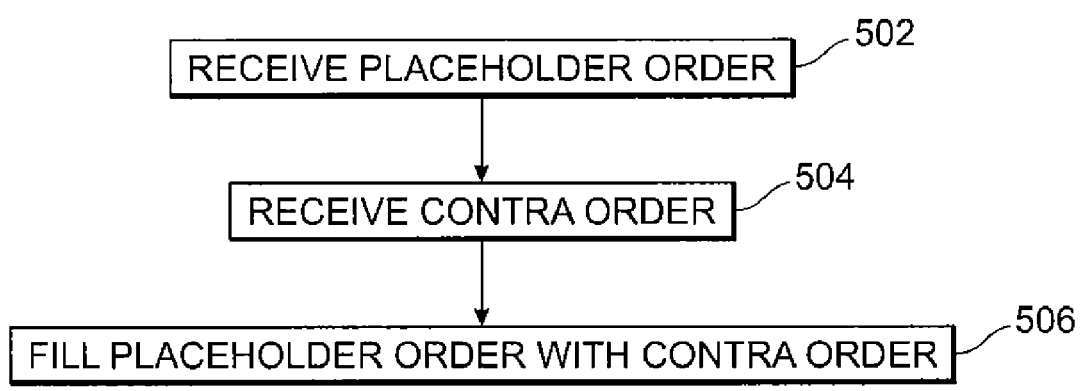
FIG. 5 is a flow chart of the preferred embodiment for placement of a Virtual Order.
Figure 3:
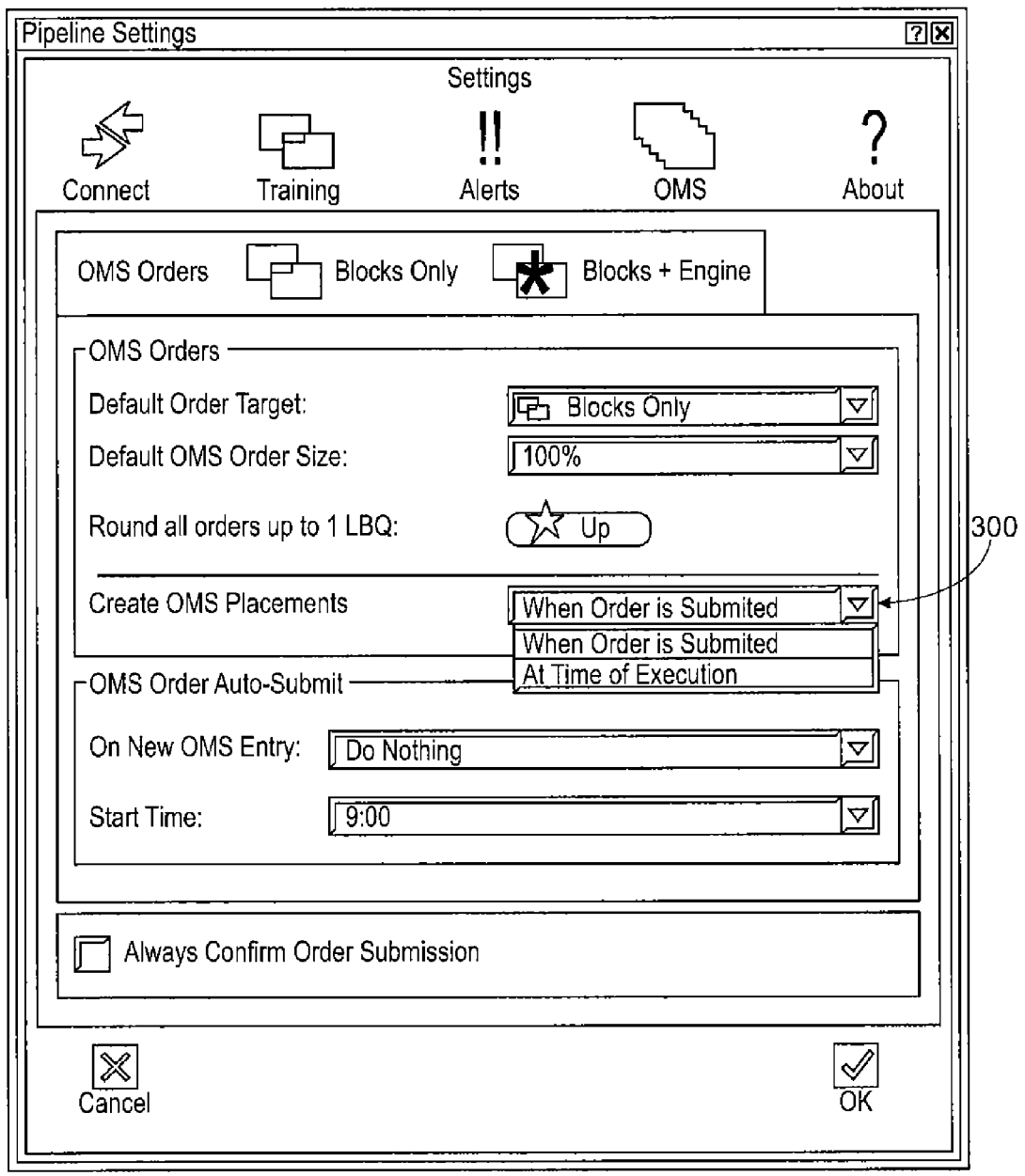
FIG. 3 represents setting management screen for a preferred embodiment of the present invention for Virtual Orders order.

Another embodiment of the invention, which can be used with the previously disclosed embodiment or separately, is the Virtual Order, which can be implemented as follows. FIG. 3 represents setting management screen for a preferred embodiment of the subject system wherein a user is able, as in element 300, to select whether he would like the subject system to create an OMS order placement when the order is initially entered into the subject system or prior to execution. When a user enters an order into the subject system, the user has two options for how his orders will be treated within the PTS. (FIG. 3, element 300). The user can choose to allow the PTS to "reserve" or take the shares represented in the order out of the OMS at the moment he enters the order. If the shares are reserved at the time the order is created, then those shares are "tied up" in the subject system and are not available for execution elsewhere. Alternatively, the user can choose to enter a Virtual Order when he enters the order. Rather than actually reserving the shares in the OMS at the moment the order is placed, this creates a Virtual Order or "placeholder" order in the PTS. (FIG. 5, step 502). If a contra to that "placeholder" order arrives in the subject system (FIG. 5, step 504); before an execution, the subject system will then check information about the orders in the OMS of the user who entered the Virtual Order, or check the user's OMS directly to determine how many of the shares represented by that Virtual Order are still available for execution. If some or all of the shares are still available for execution, the subject system will automatically execute an order with as many of the remaining shares represented by that Virtual Order as possible (FIG. 5, step 506). Again it is critical to note that that while the shares represented by the Virtual Order are not reserved by the subject system until the moment of execution; the Virtual Order is still a firm, auto-executable liability. When a Virtual Order is matched in the subject system the initiating user is not given the option of cancelling the order or altering the size or price of the order before execution; the subject system automatically executes as many of the shares represented by the Virtual Order that are still available.

The following provides a specific example of how the Virtual Order option works within the subject system. A user enters a Virtual Order for 1,000,000 shares. If a contra to that 1,000,000 Virtual Order arrives in the subject system the PTS matching engine generates an encrypted message that it sends to the client GUI of the user with the Virtual Order. The encrypted message asks the client GUI if all or some of the 1,000,000 shares represented in the Virtual Order are still available in the OMS. The subject system's GUI then checks information about the orders in the user's OMS or checks the user's OMS directly to determine if all or some of the represented shares are still available. If some or all of the shares are still available, then the client GUI sends back a message to the PTS creating a true order placement (one that does physically reserve those shares) for the highest number of available shares. In this example, if 900,000 of the original 1,000,000 share Virtual Order are still available, the client GUI will send a placement for 900,000 shares. The order then auto executes for the highest number of shares possible. Neither trader is aware of any of the steps that proceed this auto execution between the contra orders, nor is either trader given the option to cancel or modify the order in any way before the auto execution.

Figure 6A:
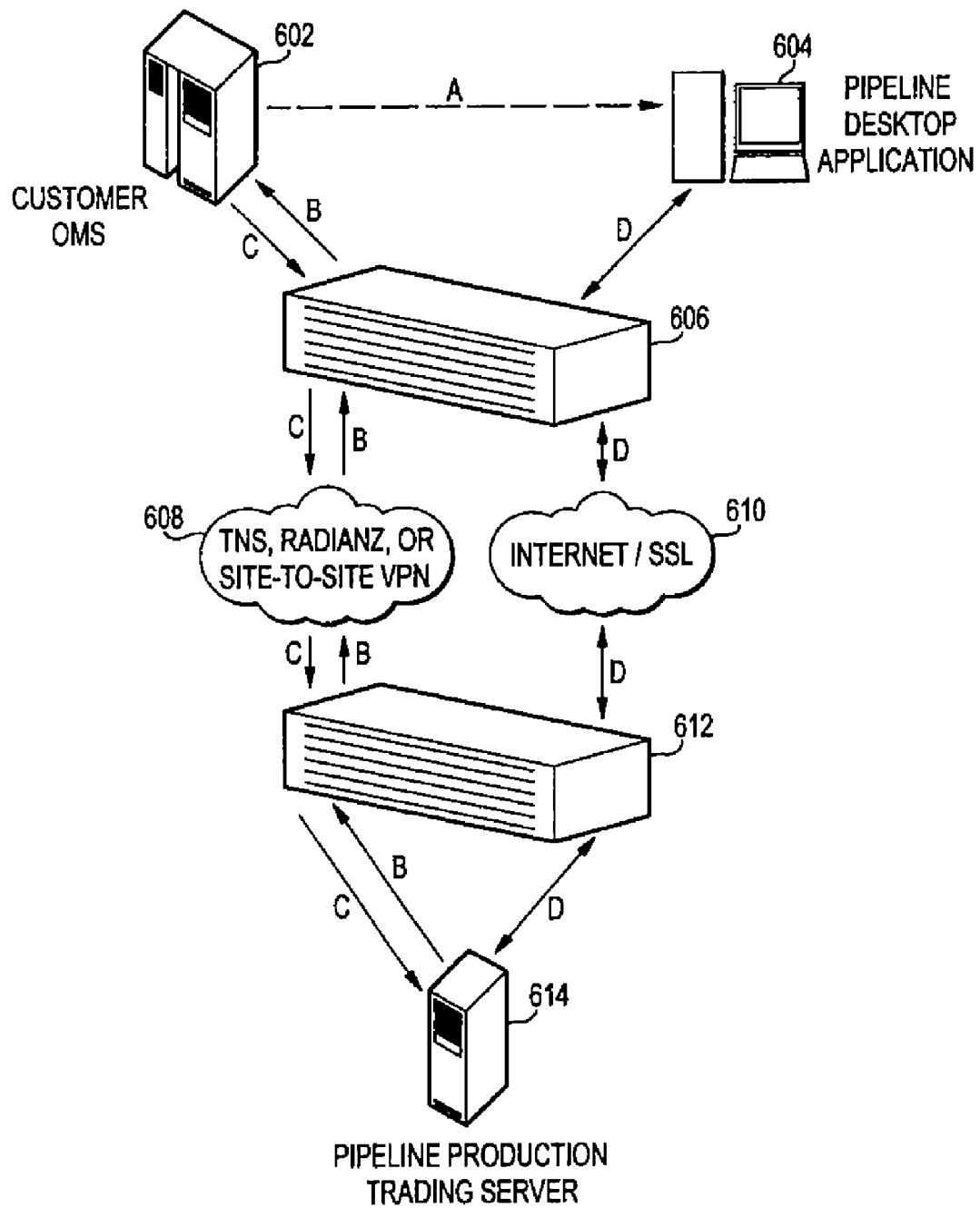
FIGS. 6A-6C are schematic diagrams of a system and variations on which the preferred or other embodiments of the invention can be implemented.
Figure 6B:
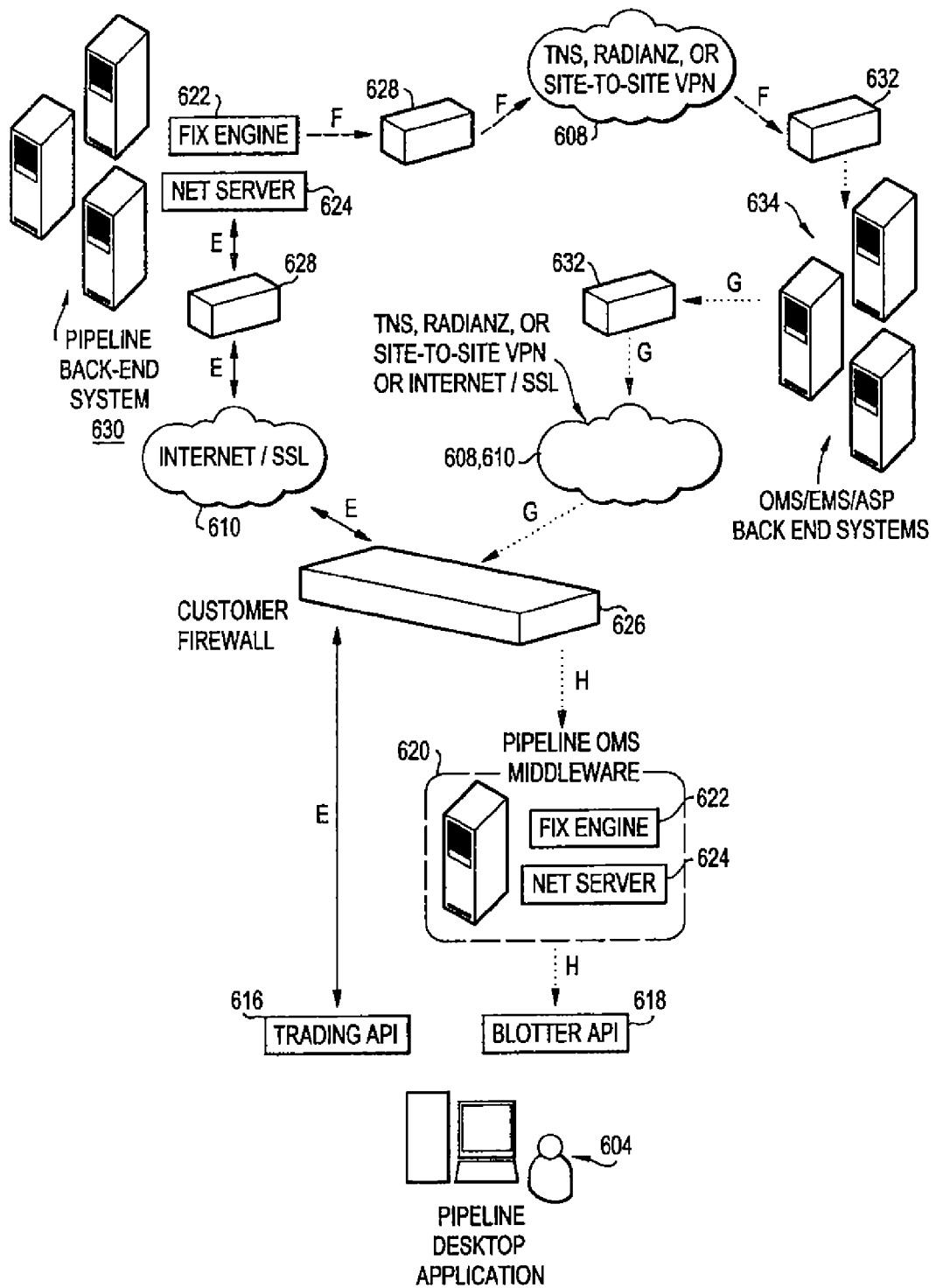
Figure 6C:
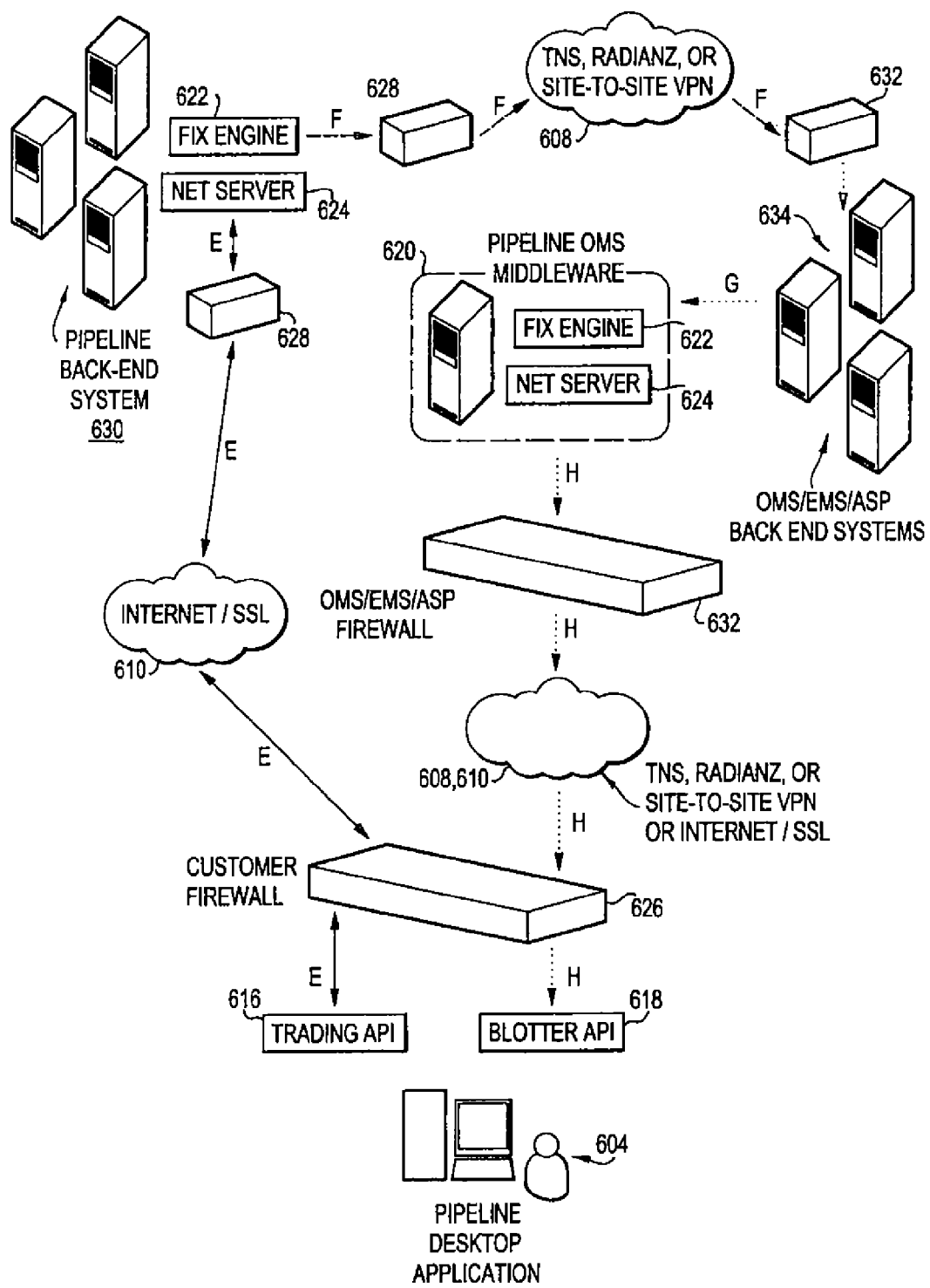

FIGS. 6A-6C are schematic diagrams showing hardware on which the above or other embodiments can be implemented. FIG. 6A shows an implementation in which there is no middleware. A customer OMS 602 and a workstation running a client GUI (desktop application) 604 are behind a firewall 606. The OMS 602 and the client GUI 604 communicate through a virtual private network 608 and the Internet 610, respectively, and another firewall 612 to a trading server (PTS) 614. Arrows A indicate sweep events; arrows B, placements and executions; arrows C, FIX (Financial Information Exchange) acknowledgments and non-acknowledgements; and arrows D, the client API.

FIG. 6B shows the use of middleware at the customer site. The GUI 604 includes a trading API 616 and an OMS API 618. The middleware 620 includes a FIX engine 622 and a net server 624. The GUI 602 and the middleware 620 reside behind a customer firewall 626. The trading API 616 in the GUI 604 communicates, as indicated by arrows E, through the customer firewall 626, the Internet 610, and a back-end firewall 628 with the back-end systems 630, which also have a FIX engine 622 and a net server 624. In a trading session, the back-end systems 630 communicate, as indicated by arrows F, through the firewall 628, a VPN 608 and another firewall 632 to OMS back-end systems 634. In an OMS publish session, the OMS back-end systems communicate, as indicated by arrows G, through the firewall 632, a VPN 608 or the Internet 610, and the customer firewall 626 with the middleware 620. In an OMS API data flow, the middleware 620 communicates with the OMS API 618 in the GUI 604, as indicated by arrow H.

FIG. 6C shows the middleware 620 at the OMS back-end systems 634. The data flow of FIG. 6C differs from that of FIG. 6B in that OMS publish session goes only as far as the middleware 620, which is behind the OMS back-end firewall 632, and in that the OMS subscribe API data flow goes thence through the firewall 632, a VPN 608 or the Internet 610, and the customer firewall 626 to the OMS API 618 in the GUI 604.

While preferred embodiments have been set forth above, those skilled in the art who have reviewed the present disclosure will readily appreciate that other embodiments can be realized within the scope of the invention. For example, numerical values are illustrative rather than limiting. Also, embodiments disclosed separately can be combined in any suitable manner. Moreover, the invention has applicability beyond the trading of securities, including the trading of financial products (stocks, bonds, options, futures, currencies, etc.) and non-financial items. Furthermore, while it is contemplated that the invention can be used with Order Management Systems as now understood, the invention can also be used with any other information management system that tracks and/or manages trading interest and/or order information as would be known to those skilled in the art, for example but not limited to EMS's (electronic management systems) and other such systems that exist now or may be developed later. Therefore, the term "order management system" should be construed as encompassing all such systems unless otherwise limited. Therefore, the present invention should be construed as limited only by the appended claims.

We claim:

1. A method for trading items among a plurality of traders, the method comprising:
    (a) receiving a first order for at least one item from one of the traders into an electronic trading system, wherein the first order provides priority for said at least one item but does not reserve said at least one item;
    (b) receiving, from another one of the traders, a second order into the electronic trading system that matches said first order;
    (c) determining that at least a portion of the first order is available to be filled by at least a portion of the second order;
    (d) reserving said at least a portion of said first order for execution against said at least a portion of said second order; and
    (e) executing said at least a portion of said first order against said at least a portion of said second order.

2. The method of claim 1, wherein the traders are given an option to place reserved or unreserved orders.

3. The method of claim 1, wherein, after step (e), an unfilled portion of the first order is canceled.

4. The method of claim 1, wherein said first order is given time priority in an order queue without actually reserving the shares of said first order until execution is imminent.

5. The method of claim 1, wherein step (c) includes checking an order management system to determine how many shares of said first order remain available for execution.

6. The method of claim 1, wherein said first order is a firm, auto-executable liability.

7. The method of claim 1, wherein after said at least a portion of said first order is reserved for execution against said at least a portion of second order, said at least a portion of said first order cannot be canceled.

8. The method of claim 1, wherein after said at least a portion of said first order is reserved for execution against said at least a portion of said second order, the size of said at least a portion of said first order cannot be altered.

9. The method of claim 1, wherein after said at least a portion of said first order is reserved for execution against said at least a portion of said second order, the price of said at least a portion of said first order cannot be altered.

\* \* \* \* \*